No. 828,622. PATENTED AUG. 14, 1906.
C. P. MAYER.
BRICK AND TILE CUTTING MACHINE.
APPLICATION FILED AUG. 5, 1905.
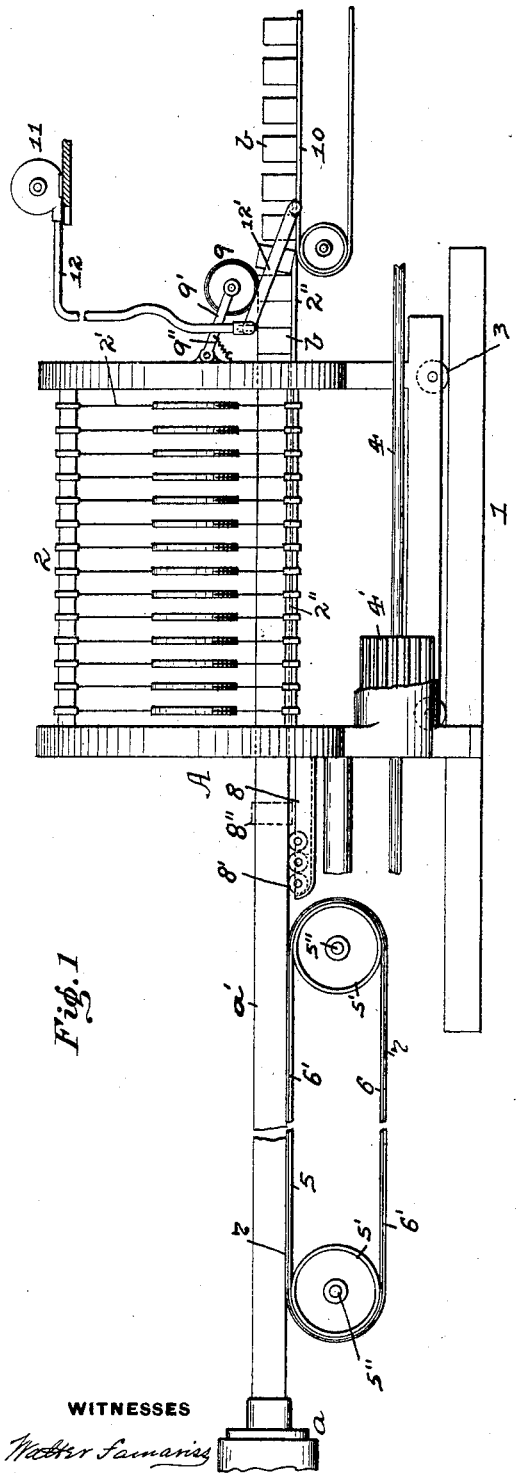
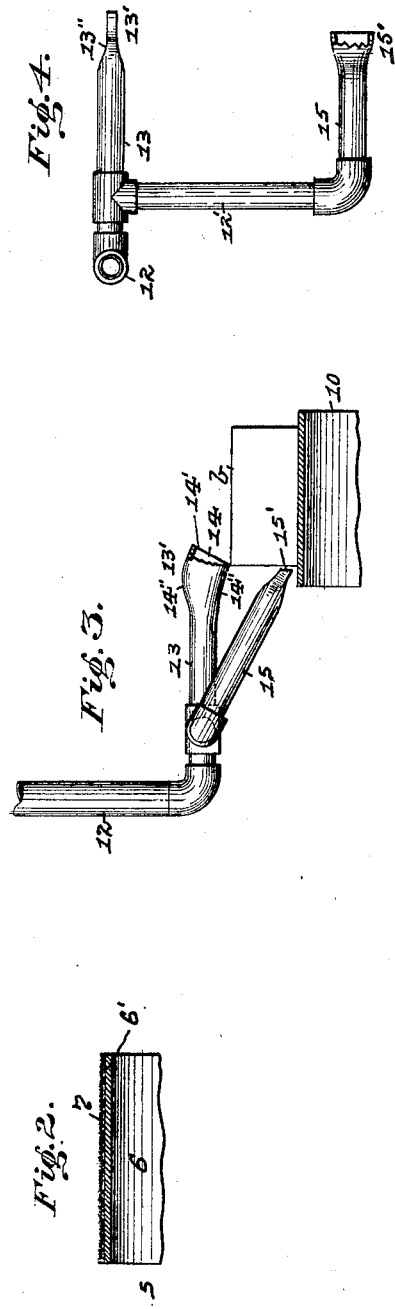
WITNESSES
INVENTOR
Casper P. Mayer,
By J. N. Cooke,
Attorney

UNITED STATES PATENT OFFICE.

CASPER P. MAYER, OF BRIDGEVILLE, PENNSYLVANIA.

BRICK AND TILE CUTTING MACHINE.

No. 828,622.　　　Specification of Letters Patent.　　　Patented Aug. 14, 1906.

Application filed August 5, 1905. Serial No. 272,875.

*To all whom it may concern:*

Be it known that I, CASPER P. MAYER, a resident of Bridgeville, in the county of Allegheny and State of Pennsylvania, have invented a new and useful Improvement in Brick and Tile Cutting Machines; and I do hereby declare the following to be a full, clear, and exact description thereof.

My invention relates to brick and tile cutting machines, and has special reference to the general class of brick machinery such as is shown in United States Letters Patent No. 675,825, granted on June 4, 1901, to E. M. Freese for brick and tile cutting machine.

The object of my invention is to provide means for removing any particles of clay left on the bricks or between them after they are cut by the cutting-wires and before they are removed from the endless belts located beyond such wires.

My invention consists, generally stated, in the novel arrangement, construction, and combination of parts, as hereinafter more specifically set forth and described, and particularly pointed out in the claims.

To enable others skilled in the art to which my invention appertains to construct and use my improved brick-machine, I will describe the same more fully, referring to the accompanying drawings, in which—

Figure 1 is a side elevation of the machine. Fig. 2 is an enlarged cross-section of one of the belts employed. Fig. 3 is an enlarged cross-section of another belt and looking in the direction of the cutting-wire frame. Fig. 4 is an enlarged top view of the blowing device shown in Fig. 3.

Like symbols of reference herein indicate like parts in each of the figures of the drawings.

As illustrated in the drawings, A designates the cutting-machine, which has a stationary frame 1, and on this frame is a carriage 2, which is longitudinally movable on said frame by means of the wheels 3, mounted on said carriage, and is adapted to be moved along the said rails on said frame 1. The carriage 2 is adapted to be moved as desired by means of suitable mechanism connected to a driving-pinion 4', loosely mounted on a constantly-operated driving-shaft 4, with which it may be made to revolve by any suitable clutch (not shown) on said shaft. The carriage 2 carries the cutting-wires 2' therein for cutting the bar of clay $a'$ into the bricks $b$, which bar passes through said carriage and on the sectional cutting-plate 2" thereon from the die $a$ of the mixing-machine while said carriage is being moved by said shaft 4 and during the continued movement of said bar of clay.

Between the carriage 2 and the die $a$ is the endless receiving-apron 5, the top of which travels in line with the bottom of said die, so as to receive the bar $a'$ of clay issuing from the latter, and such apron passes around the wheels 5', mounted on shafts 5", which are supported in any suitable manner. The apron 5 is formed of an endless belt 6, which is preferably formed of leather, and upon the face 6' of the endless belt is secured a continuous covering 7 of yielding material—such as felt, canton flannel, or other fibrous material—and upon this covering the continuous slab or bar of clay is pushed and carried along by said endless apron 5.

Between the carriage 2 and the endless apron 5 is the roll-trough 8, which is carried by and mounted upon said carriage and is equipped with the lubricating-rolls 8' and 8", which are designed to lubricate the bottom and one side of the bar of clay $a'$ to avoid liability of its adhering to the plate 2" and its support in passing through the cutting-carriage.

A roller 9 is adapted to engage with the top of the bricks $b$ after they are cut from the bar $a'$ by the cutting-wires 2' and while they are passing along the cutting-plates 2" onto the endless belt or conveyer 10, such roller being mounted in a frame 9', pivoted to the end of the carriage 2, and being assisted in its operation by a spiral spring 9", connected to said frame and to said carriage.

Leading from any suitable blower 11 is an air-supply pipe 12, which is adapted to supply a blast of air to a nozzle 13, which has in its outer end 13' an opening 14, located at one end of the bricks $b$ and in front of the roller 9 and such nozzle flared outwardly on its sides, as at 13", in order to have the opening 14 conform to the thickness of said bricks. The edges of the said flared sides of said nozzle 13 and surrounding said opening 14 are inclined upwardly and outwardly, as at 14′, and the top and bottom of said nozzle adjacent to said opening and at the end 13′ of said nozzle are outwardly-flaring, as at 14″, in order to permit the air-blast to be thrown entirely throughout the length of such bricks b.

Leading outward from the nozzle 13 is a branch pipe 12′, which has a nozzle 15 connected thereto and provided with a tapered or pointed outer end 15′, and this outer end is adapted by its opening to project an air-blast in the spaces between the bricks b on the endless conveyer 10 as they are passed from the cutting-plate 2″.

The use and operation of my improved brick-cutting machine are as follows: The carriage 2, when at rest, is at that end of its longitudinal movement toward the die a of the brick-machine and the shaft 4 is constantly operated by any suitable means, and preferably the mechanism by which the brick-machine is operated, and the pinion 4′ is idle on said shaft while the latter is being rotated. The bar of clay a′ fed onto the fibrous covering 7 of the apron 5 from the die a of the brick-machine causes said apron to travel with it, and such bar passes over and along the lubricating-rolls 8′ 8″ onto the cutting-table 2″ in the carriage 2, where it will be cut into the bricks b by the cutting-wires 2′ in said carriage. After the bar a′ has been thus cut into the bricks b by said cutting-wires 2′ such bricks will pass along that portion of the table 2″ beyond the carriage 2 onto the endless conveyer 10, which travels faster than the bar of clay a′, so that the bricks are separated as they are received by this conveyer in order that they may be conveniently removed or carried away the desired distance, according to the length of this conveyer. While the bricks b are still on the cutting-plate 2″ and before they are passed onto the conveyer 10 a blast of air is forced over the top of said bricks from the blower 11 through the opening 14 in the nozzle 13 and before such bricks pass under the lubricating-roller 9 in order to remove any particles of clay left or dropped on the tops of said bricks by the action of the cutting-wires 2′ in severing the bar of clay. After the bricks b have passed under the roller 9 and into the conveyer 10 from the cutting-plate 2″ a blast of air is also forced across said conveyer and between the separated bricks b from a pointed end 15′ of the nozzle 15, connecting the nozzle 13 by the branch pipe 12′ in order to remove any particles of clay left along the sides of said bricks or on the conveyer by the action of the cutting-wires 2″ in thus severing the bar of clay.

It will thus be seen that my improved brick-cutting machine provides for keeping the bar of clay from contact with the apron or belt in passing from the die to the cutting-frame and will prevent such bar from sticking to such apron at any point by reason of the continuous yielding surface on said apron, thereby overcoming all liability of injuring or marring the clay bar from such belt or any cross-bars which might be used on a carrier-belt located on said apron. It will also be evident that by reason of the means provided for removing the cuttings or any particles of clay left on said bricks by such cutting before said bricks are passed under the lubricating-roller and before and after such bricks are separated the bricks will be smooth and even and will not have any unsightly marks on the same after being burned by reason of said cuttings being pressed into the bricks by said roller. The means for obtaining these different results are simple and effective in their application to the cutting-machine, will not get out of order, and will add very little cost to the machine, while, as has been found in the practical use of the devices, the clay bar and bricks will be prevented from being injured or marred in any manner whatever, as that the bricks after they are burned will not have rough edges or be made unsightly in appearance.

Various modifications in the construction and design of the various parts of my improved cutting-machine may be resorted to without departing from the spirit of the invention or sacrificing any of its advantages.

What I claim as my invention, and desire to secure by Letters Patent, is—

1. A brick or tile cutting machine comprising a cutting device, a roller for engaging with said bricks, and means for removing the cuttings for other particles of clay from said bricks after cutting and before passing under said roller.

2. A brick or tile cutting machine comprising a cutting device, a roller for engaging with said bricks, and an air-blowing device for removing the cuttings or other particles of clay from said bricks after cutting and before passing under said roller.

3. A brick or tile cutting machine comprising a cutting device, an endless conveyer for receiving and separating the bricks after cutting, and means for removing the cuttings or other particles of clay from said bricks after being separated.

4. A brick or tile cutting machine comprising a cutting device, an endless conveyer for receiving and separating the bricks after cutting, and an air-blowing device for removing cuttings or other particles of clay from said bricks after being separated.

5. A brick or tile cutting machine comprising a cutting device, a roller for engaging with said bricks, an endless conveyer beyond said roller for receiving and separating the bricks after being cut and rolled, and means for removing the cuttings or other particles from said bricks before passing under the roller and after being separated.

6. A brick or tile cutting machine comprising a cutting device, a roller for engaging with said bricks, an endless conveyer beyond said roller for receiving and separating said bricks after being cut and rolled, and an air-blowing device for removing the cuttings or other particles of clay from said bricks before passing under the roller and after being separated.

In testimony whereof I, the said CASPER P. MAYER, have hereunto set my hand.

CASPER P. MAYER.

Witnesses:
    J. N. COOKE,
    R. H. AXTHELM.